(12) United States Patent
Nakagawa et al.

(10) Patent No.: US 10,232,656 B2
(45) Date of Patent: Mar. 19, 2019

(54) RECORDING MEDIUM AND PRINTED MATTER PRODUCING APPARATUS

(71) Applicant: Brother Kogyo Kabushiki Kaisha, Nagoya-shi, Aichi-ken (JP)

(72) Inventors: Kazuya Nakagawa, Nagoya (JP); Yuichiro Suzuki, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/719,734

(22) Filed: Sep. 29, 2017

(65) Prior Publication Data

US 2018/0154665 A1 Jun. 7, 2018

(30) Foreign Application Priority Data

Dec. 5, 2016 (JP) ................. 2016-236270

(51) Int. Cl.
| | | |
|---|---|---|
| *B41J 2/36* | (2006.01) | |
| *B41J 29/393* | (2006.01) | |
| *B41J 3/407* | (2006.01) | |
| *G06F 3/12* | (2006.01) | |
| *B41J 2/32* | (2006.01) | |

(52) U.S. Cl.
CPC ............. *B41J 29/393* (2013.01); *B41J 2/32* (2013.01); *B41J 2/36* (2013.01); *B41J 3/4075* (2013.01); *G06F 3/12* (2013.01)

(58) Field of Classification Search
CPC ......... B41J 2/36; B41J 3/4075; A01B 12/006; G06F 3/12
See application file for complete search history.

(56) References Cited

U.S. PATENT DOCUMENTS

| | | | | |
|---|---|---|---|---|
| 8,947,481 B2 * | 2/2015 | Ishii | ................. | B41J 3/4075 347/171 |
| 8,963,975 B2 | 2/2015 | Tomomatsu et al. | | |
| 2005/0280691 A1 * | 12/2005 | Kawamoto | ................. | B41J 2/36 347/194 |
| 2014/0362157 A1 | 12/2014 | Tomomatsu et al. | | |
| 2017/0251112 A1 * | 8/2017 | Shimomura | .......... | G06F 3/1208 |

FOREIGN PATENT DOCUMENTS

JP 2014-233958 A 12/2014

* cited by examiner

*Primary Examiner* — Lamson Nguyen
(74) *Attorney, Agent, or Firm* — Banner & Witcoff, Ltd.

(57) ABSTRACT

The disclosure discloses a non-transitory computer-readable recording medium storing a print processing program for executing an increment mode acceptance step, a condition acceptance step, a determination step, and a data output step on a computing device. In the increment mode acceptance step, a setting operation of an increment mode of at least one print number is accepted. In the condition acceptance step, a setting of a specific numerical condition of the print number to be emphasized is accepted. In the determination step, it is determined whether or not the print number included in a corresponding a print object satisfies the numerical condition. In the data output step, in the case that it is determined that the print number satisfies the numerical condition, the print data is generated to apply a predetermined emphasis process to the print number.

9 Claims, 13 Drawing Sheets

[FIG. 1]
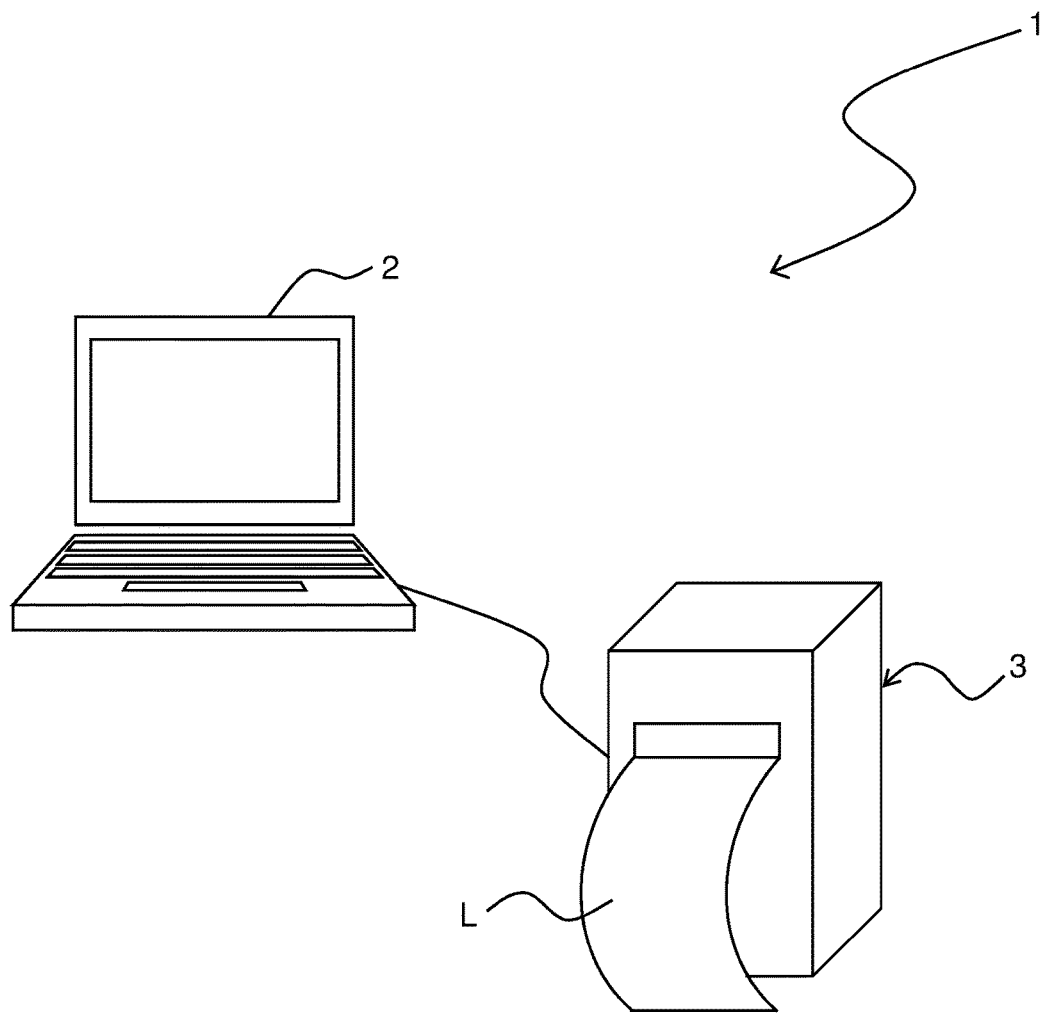

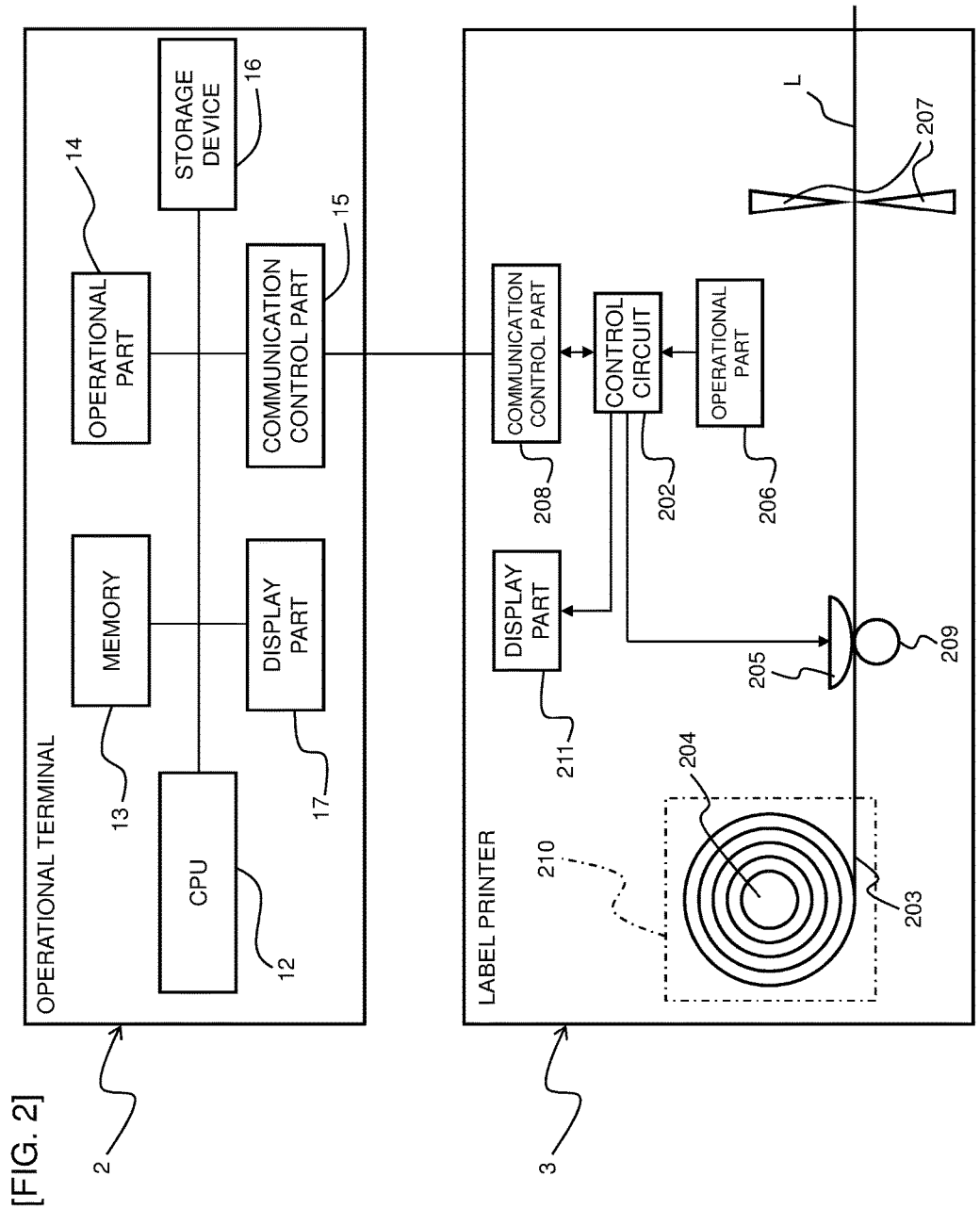
[FIG. 2]

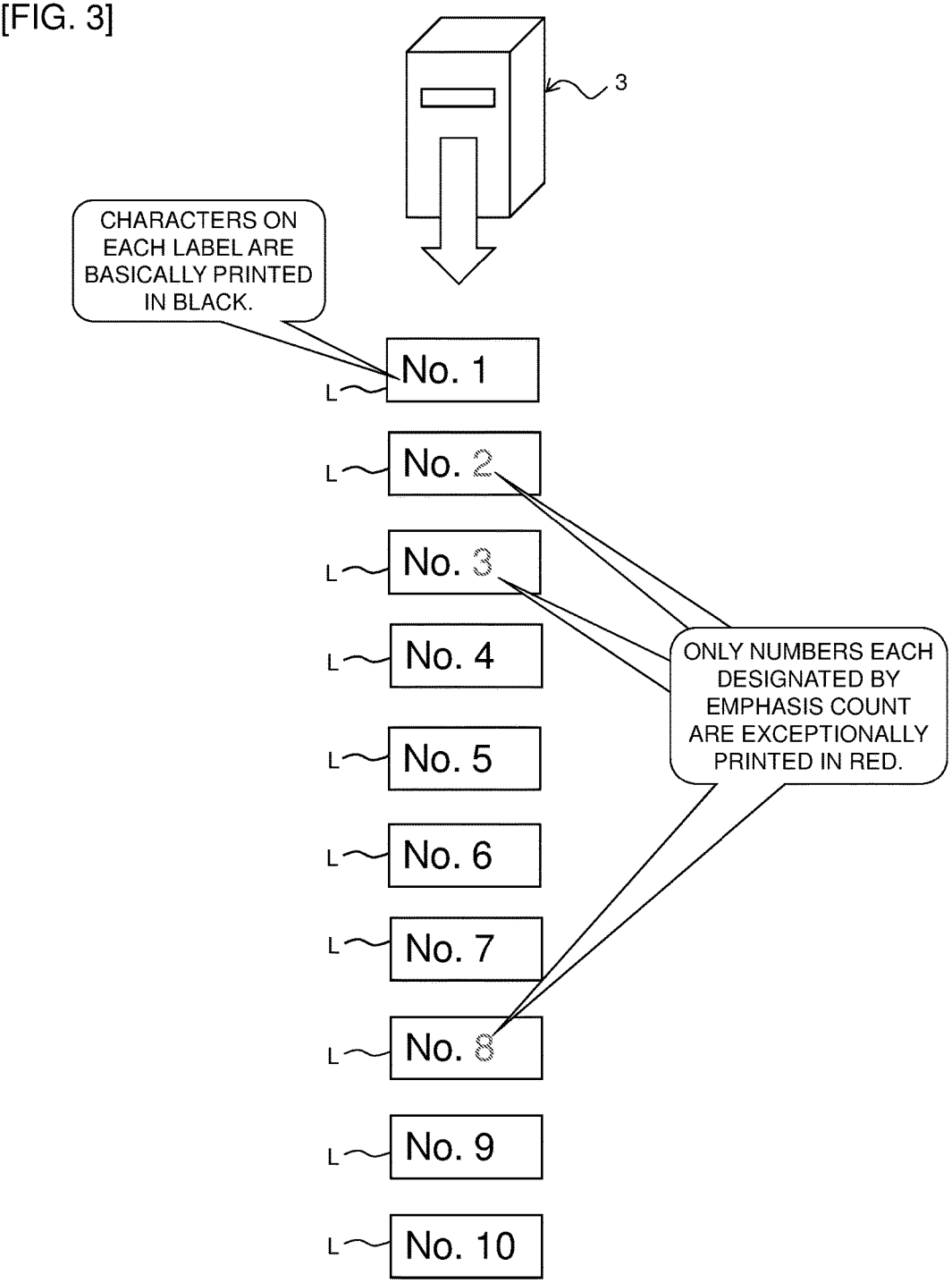
[FIG. 3]

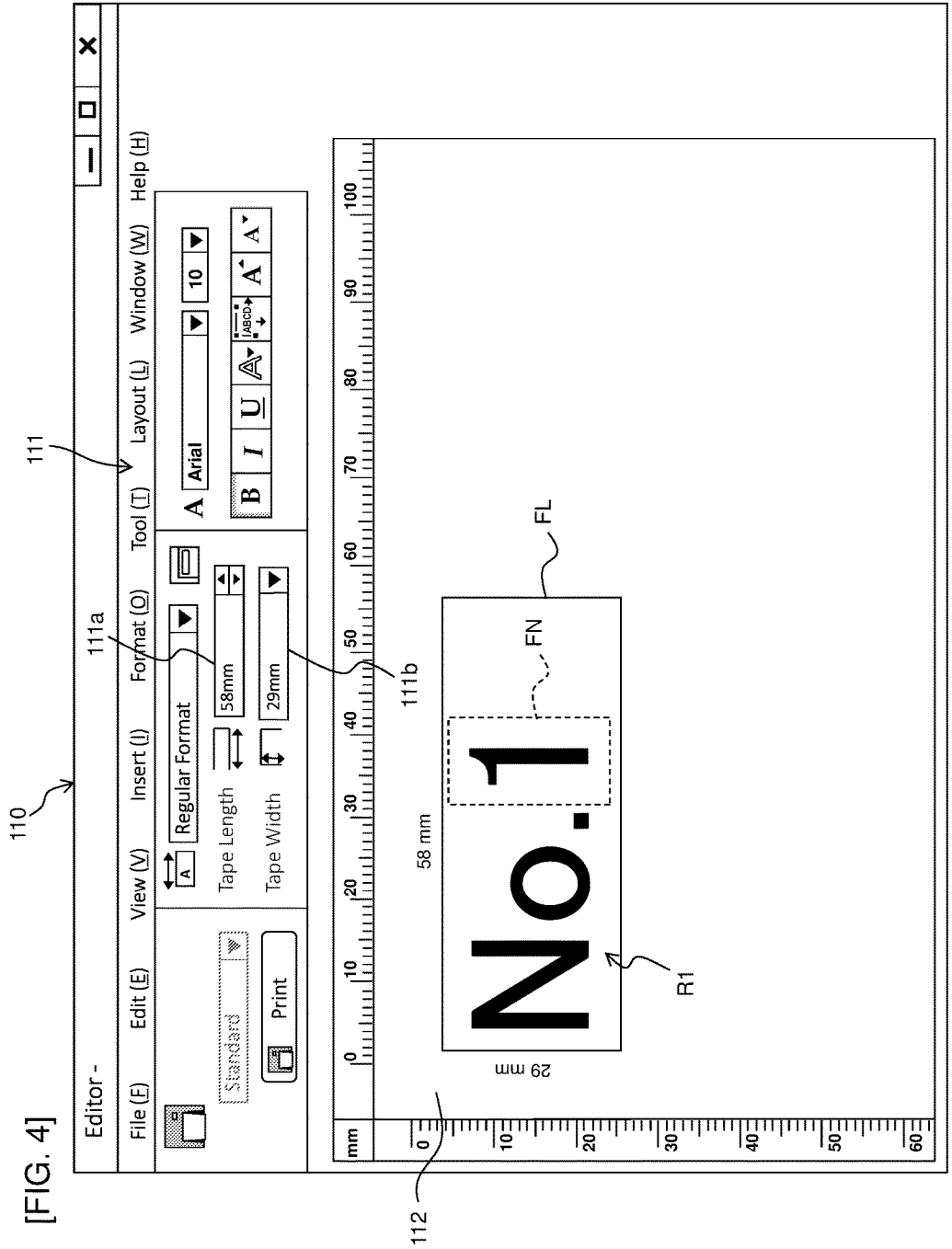

[FIG. 5]
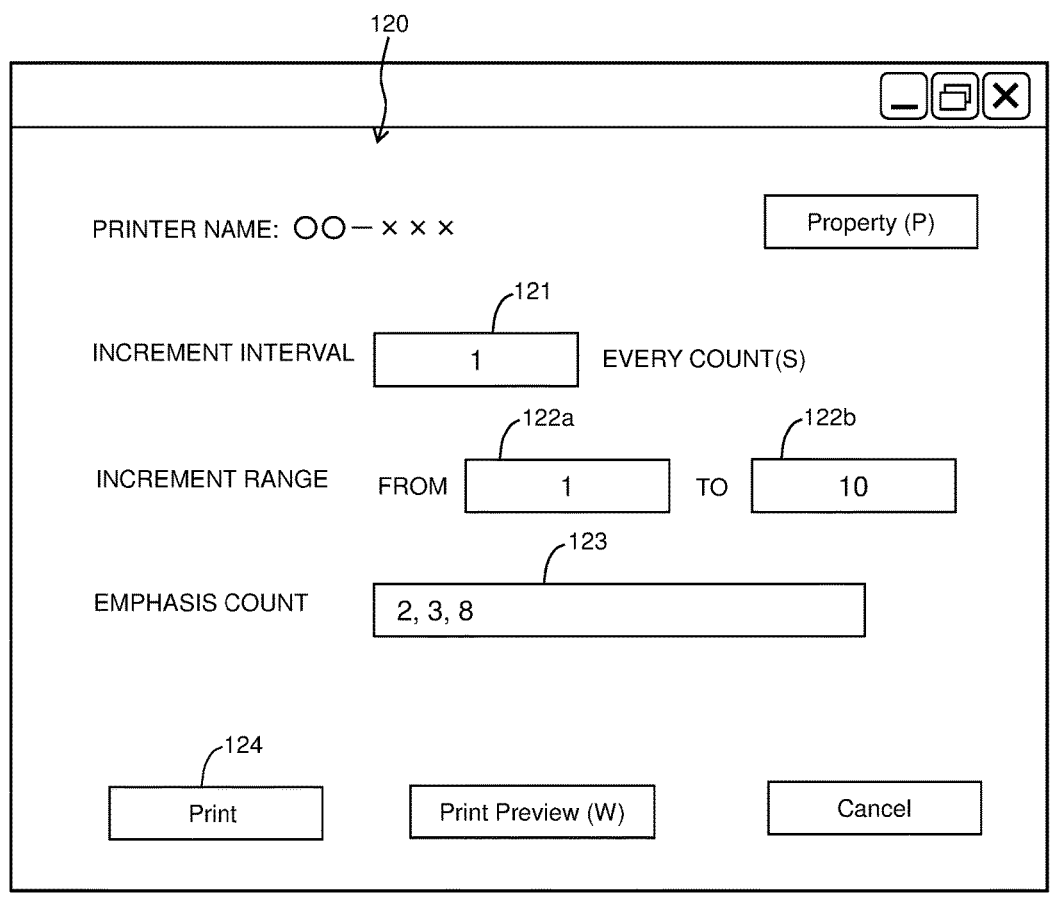

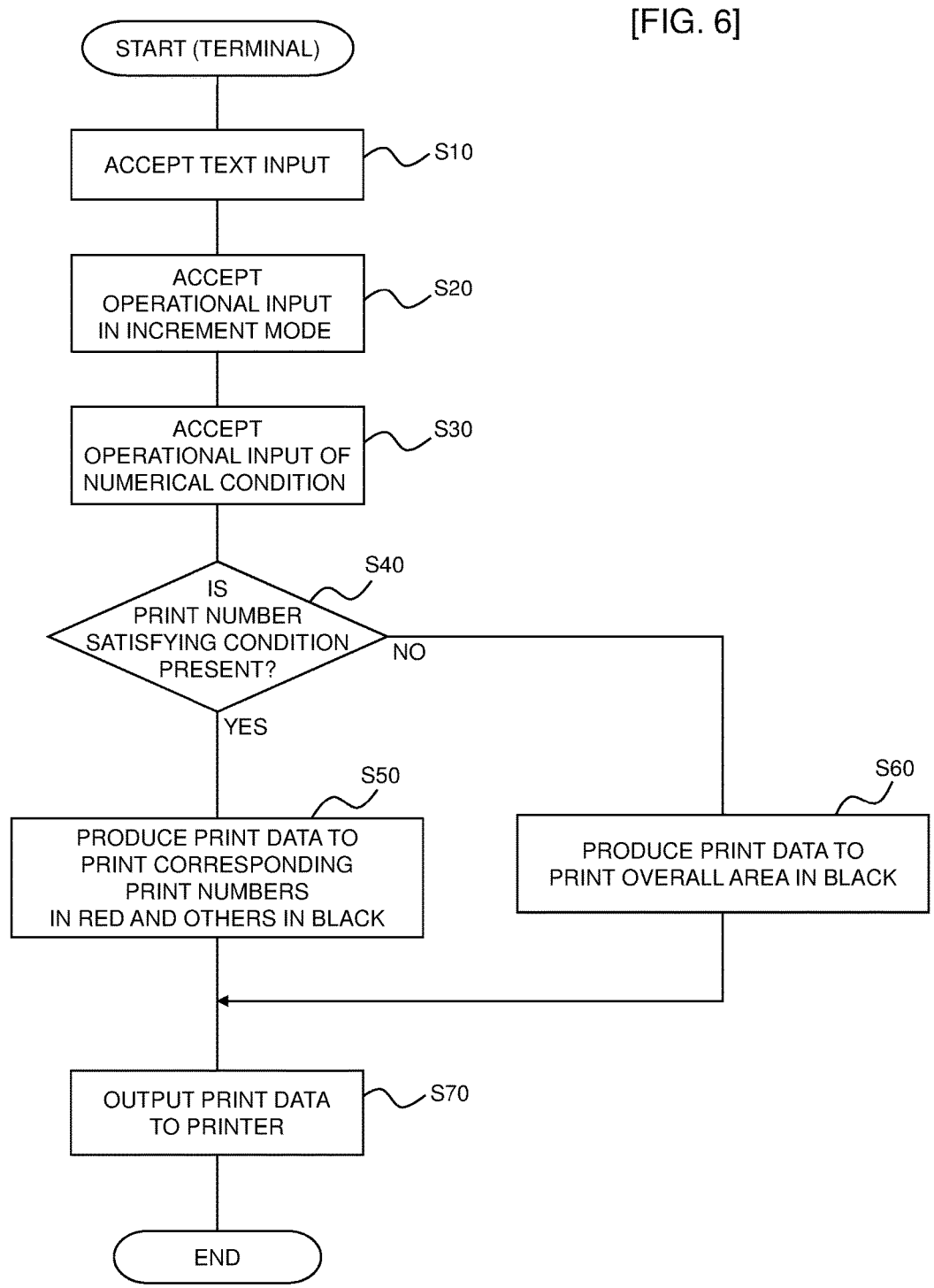
[FIG. 6]

[FIG. 7]
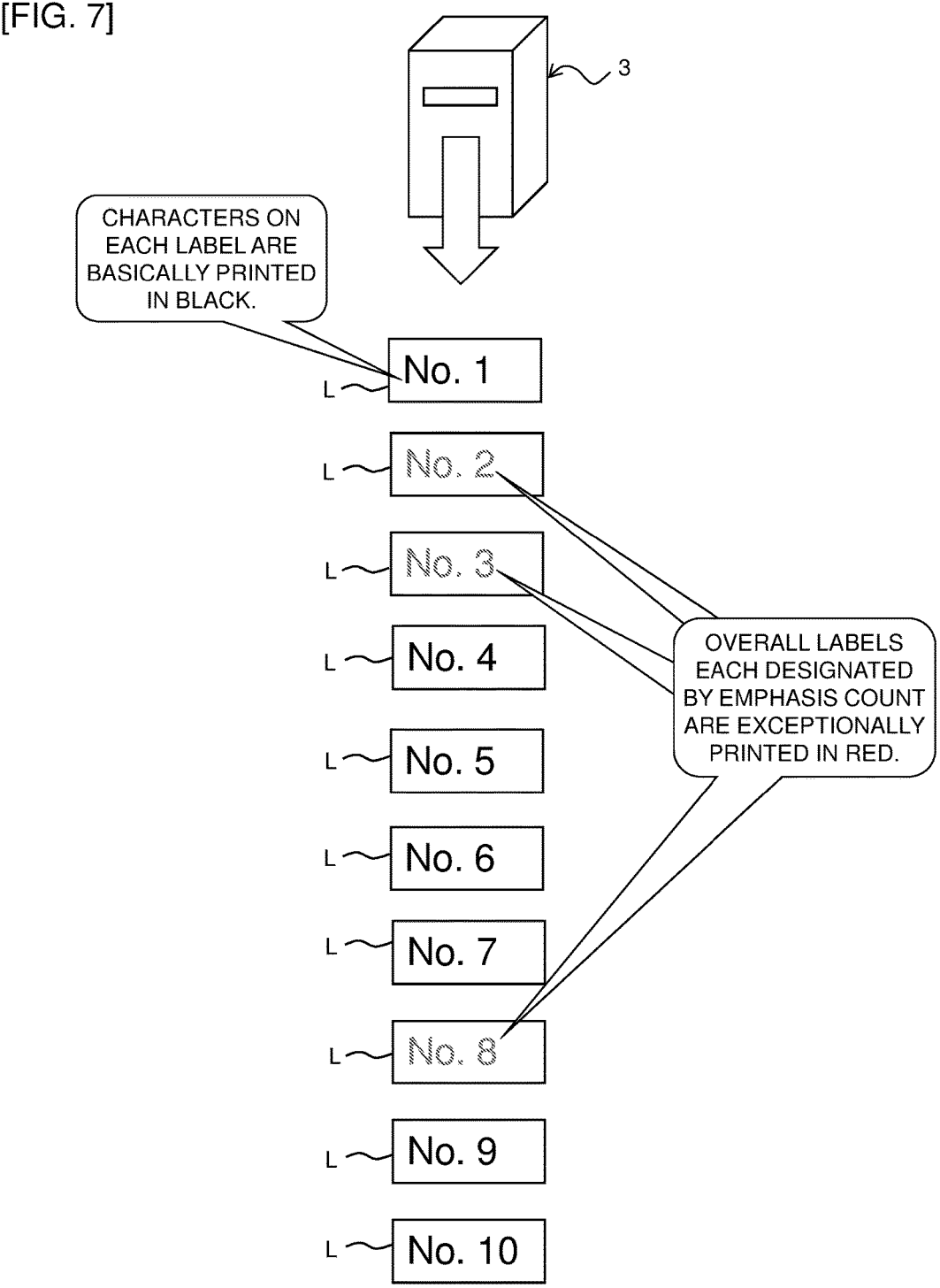

[FIG. 8]
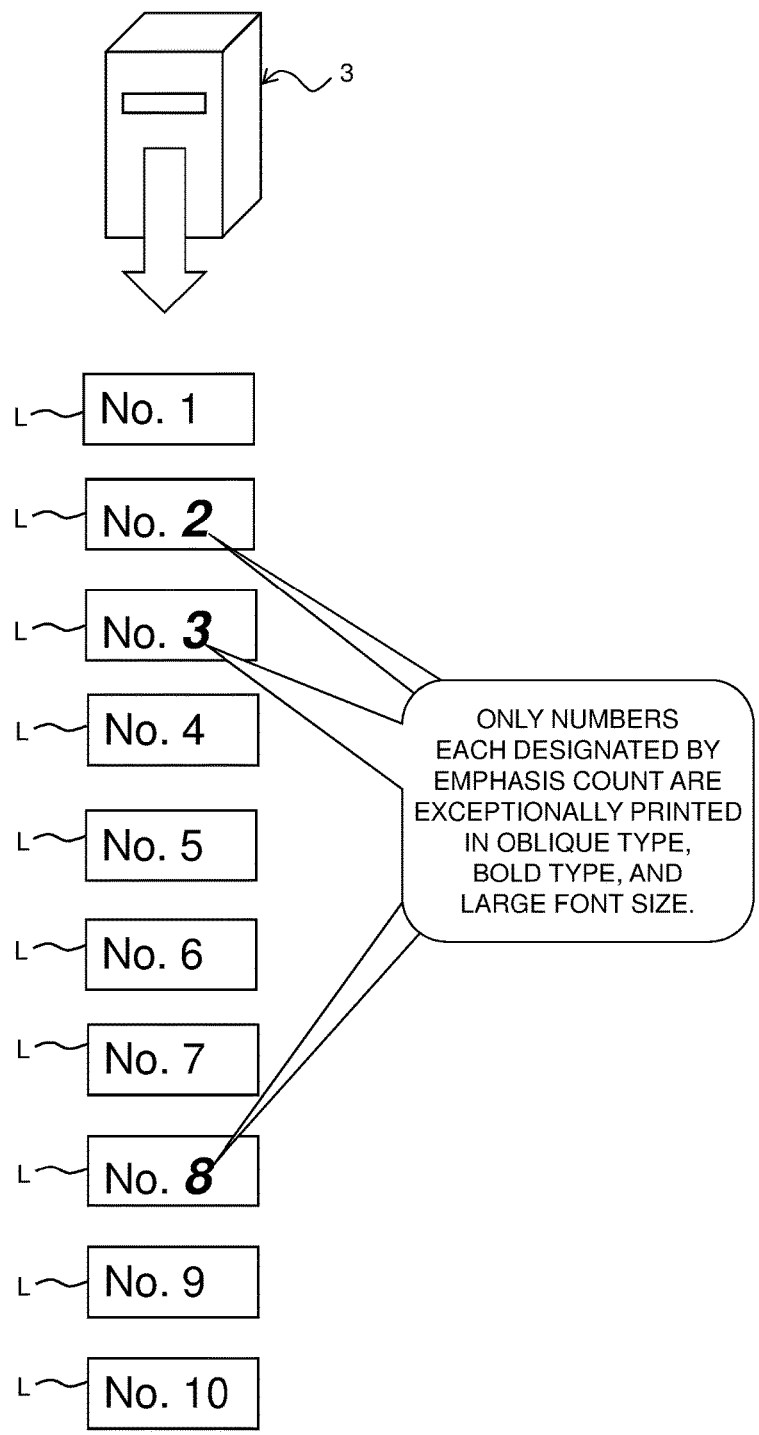

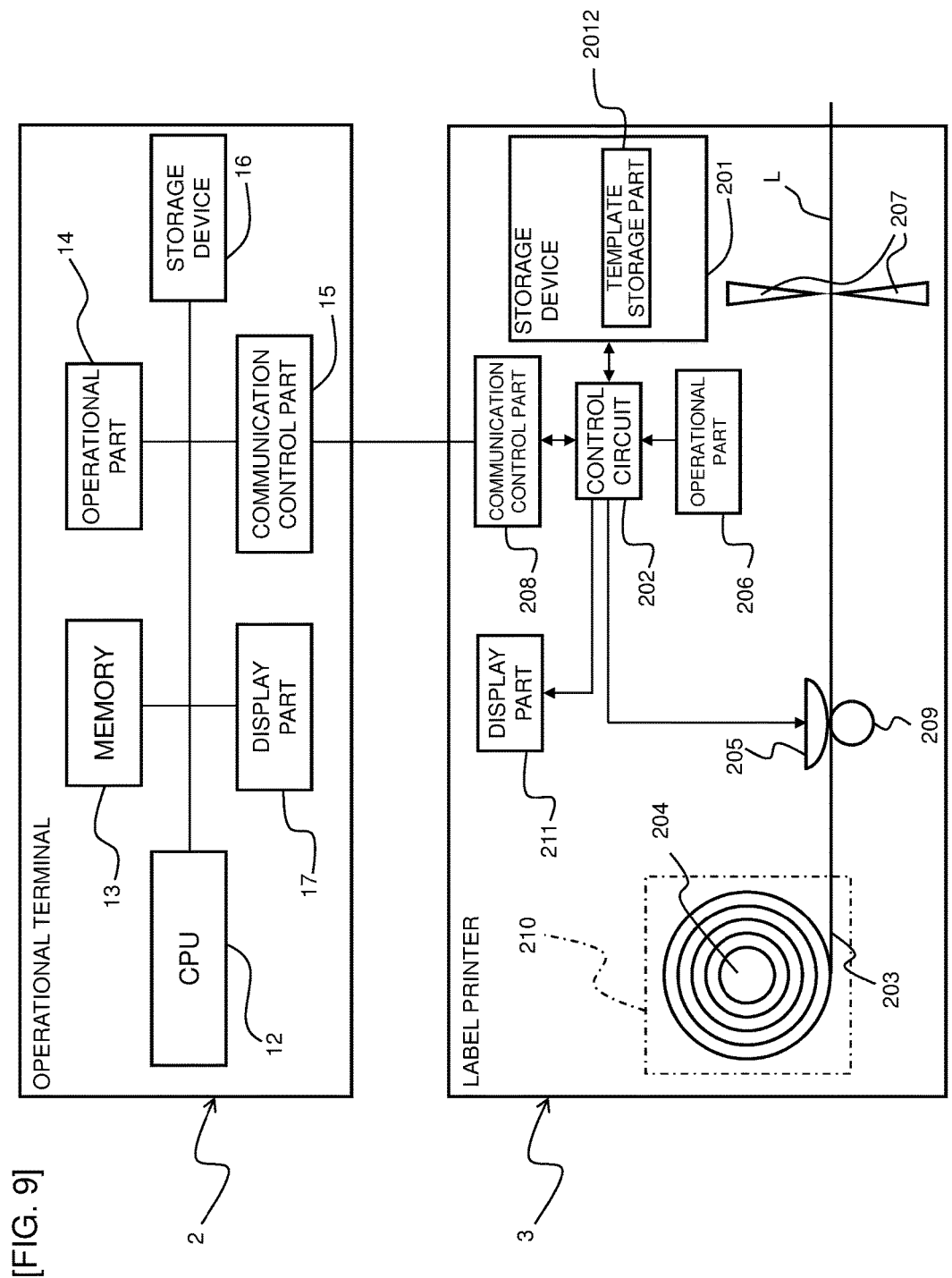
[FIG. 9]

[FIG. 10]
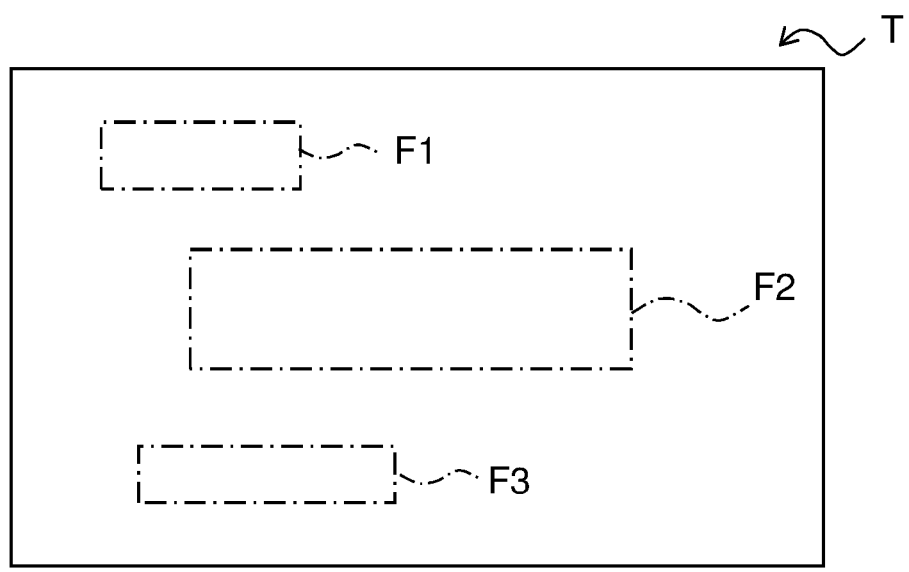

[FIG. 11A]
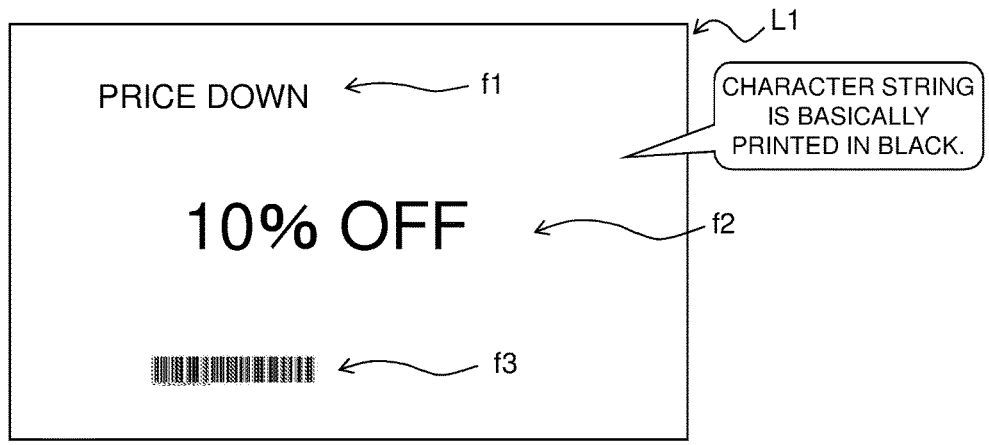
[FIG. 11B]
[FIG. 11C]
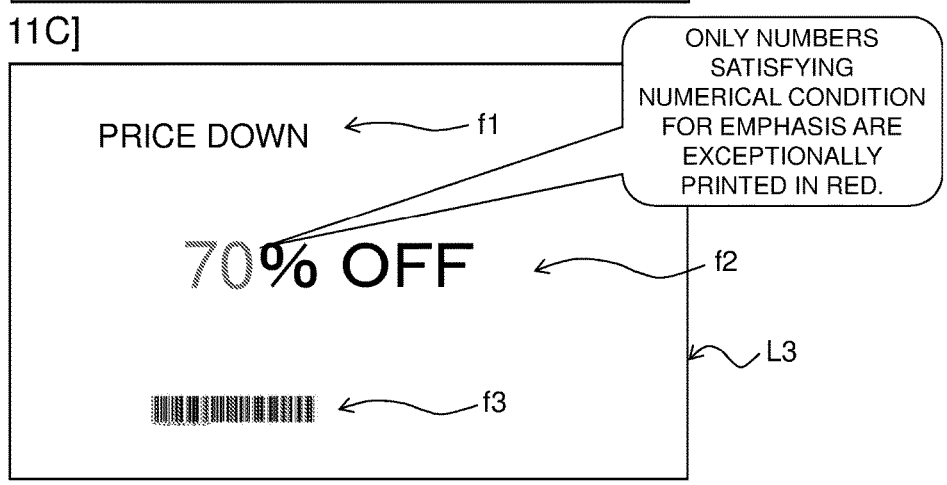

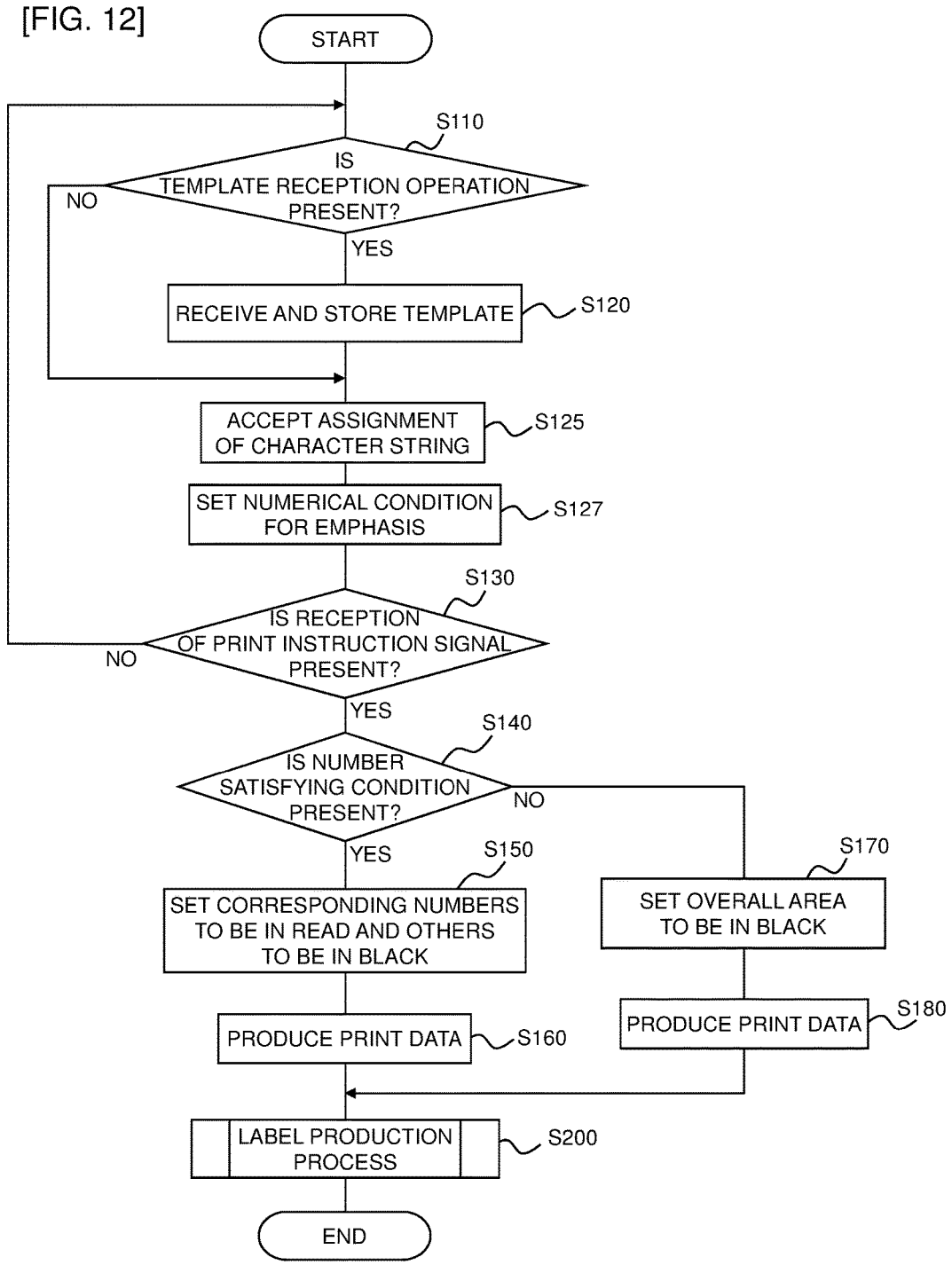
[FIG. 12]

[FIG. 13]
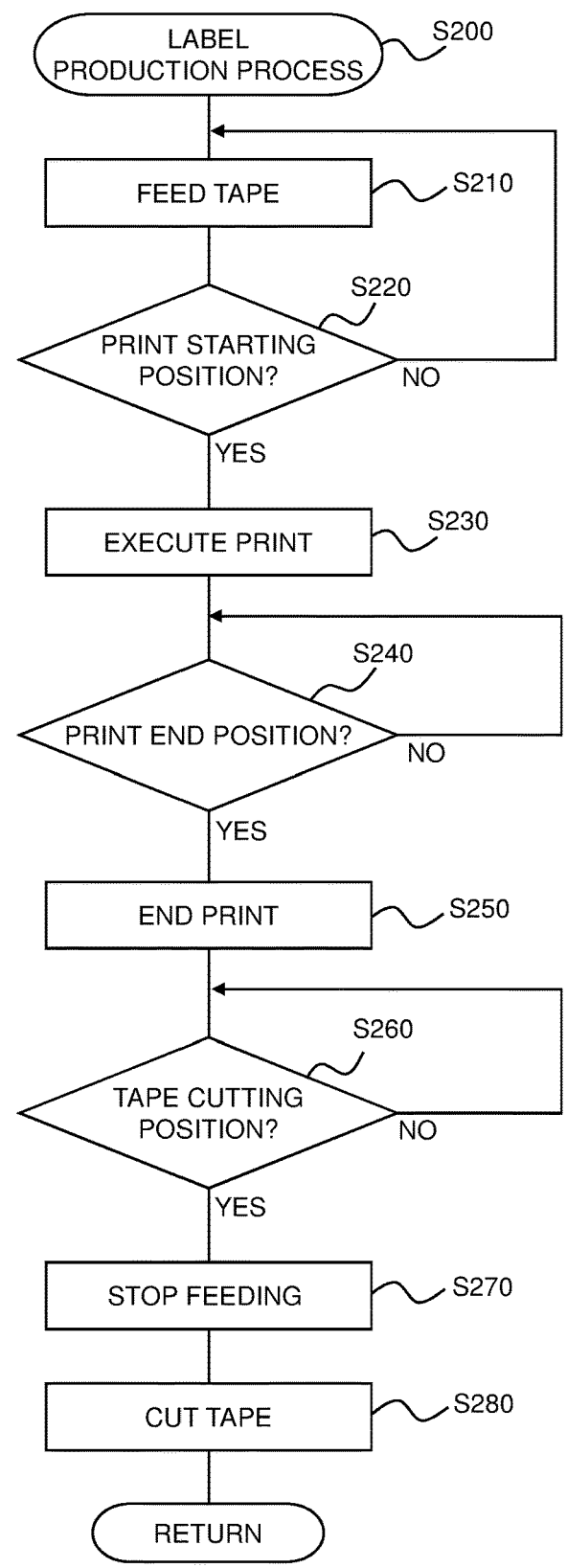

RECORDING MEDIUM AND PRINTED MATTER PRODUCING APPARATUS

CROSS-REFERENCE TO RELATED APPLICATION

The present application claims priority from Japanese Patent Application No. 2016-236270, which was filed on Dec. 5, 2016, the disclosure of which is incorporated herein by reference in its entirety.

BACKGROUND

Field

The present disclosure relates to a recording medium having a print processing program to produce a printed matter by executing desired printing for a print-receiving medium recorded thereon, and a printed matter producing apparatus.

Description of the Related Art

A technique of executing what-is-called numbering printing for a print-receiving medium is already known. In this prior art, print formation of a print object is executed by a thermal head for the print-receiving medium (a cover film) that is fed, and plural printed matters (print labels) each including the print object are thereby consecutively produced.

In this case, the print object includes a print number capable of being incremented in accordance with predetermined regularity when plural printed matters are produced as above. An operator makes a setting in relation to the incrementing (such as the increment interval, and the increment range), and plural printed matters each having a print object formed thereon that includes a print number incremented in accordance with the result of the setting are thereby produced.

In the case that the printed matters each including a print number incremented as above are produced as above, only when the print number in the printed matter presents a specific value or the value thereof is included in a specific range, a need to emphasize only this print number distinguishing this print number from the others may be present. In the ordinary printing other than the numbering printing associated with the incrementing of the print number, similarly to the above, when the number in the printed matter satisfies a specific condition, a need to emphasize the number distinguishing the number from the others may be present. In the prior art, such point is not especially taken into consideration.

SUMMARY

An object of the present disclosure is to provide a recording medium that has a print processing program stored therein that can emphasize a print number having a specific value or having a value included in a specific range without increasing any complicated operational load for an operator, and a printed matter producing apparatus.

In order to achieve the above-described object, according to one aspect of the present application, there is provided a A non-transitory computer-readable recording medium, storing a print processing program for executing steps on a computing device, the computing device provided to an operational terminal connected to a printer that comprises a first feeder configured to feed a first print-receiving medium and a first printing head configured to execute printing of a desired print object on the first print-receiving medium fed by the first feeder and is configured to consecutively produce plural first printed matters each having the print object on the first print-receiving medium, in predetermined order along a feeding direction of the first feeder, the steps comprising an increment mode acceptance step for accepting a setting operation of an increment mode of at least one print number that is included in the print object and is capable of being incremented in accordance with predetermined regularity, a condition acceptance step for accepting a setting of a specific numerical condition of the print number to be emphasized in the first printed matter, a determination step for determining whether or not the print number included in a corresponding the print object satisfies the numerical condition accepted in the condition acceptance step when each of the plural first printed matters is produced, a data generation step for generating print data to generate the plural first printed matters each having the print object formed that comprises the print number incremented in accordance with an acceptance result in the increment mode acceptance step, and a data output step for outputting the print data generated in the data generation step to the printer, and in the data output step, in the case that it is determined in the determination step that the print number included in the print object satisfies the numerical condition, the print data being generated to apply a predetermined emphasis process to the print number in the first printed matter to be produced, the print number satisfying the numerical condition.

In order to achieve the above-described object, according to another aspect of the present application, there is provided a printed matter producing apparatus comprising a second feeder configured to feed a second print-receiving medium, a second printing head configured to form a print comprising a desired character string on the second print-receiving medium fed by the second feeder, and a CPU configured to form a second printed matter having the character string formed on the second printed matter by controlling the second feeder and the second printing head in cooperation with each other, that is triggered by a printing instruction, the CPU being configured to execute a condition setting process for setting a specific numerical condition for a character string to be emphasized in the second printed matter, a determination process for determining whether or not a number satisfying the numerical condition set in the condition setting process is included in the character string formed by the second printing head when the second printed matter is formed in accordance with the printing instruction, and a coordination control process for applying a predetermined emphasis process to the number satisfying the numerical condition in the second printed matter to be formed, by controlling the second feeder and the second printing head in cooperation with each other in the case that it is determined in the determination process that the number satisfying the numerical condition is included in the character string to be formed by the second printing head.

BRIEF DESCRIPTION OF THE DRAWINGS

FIG. 1 is a schematic system configuration view showing the overall configuration of a print label production system in relation to an embodiment of the present disclosure.

FIG. 2 is a functional block view showing the functional configurations of an operational terminal and a label printer.

FIG. 3 is an explanatory view showing a production example of a print label.

FIG. 4 is an explanatory view showing an example of an edit screen displayed on a display part when a print data edit application is started up on the operational terminal.

FIG. 5 is an explanatory view showing an example of an increment designation screen displayed on the display part of the operational terminal.

FIG. 6 is a flowchart showing control steps executed by a CPU of the operational terminal.

FIG. 7 is an explanatory view showing a modification example where the overall print object designated by an emphasis count is printed in a red color.

FIG. 8 is an explanatory view showing a modification example where print numbers of print objects each designated by the emphasis count is processed to be emphasized by a font type, a font style, a font size, and the like.

FIG. 9 is a functional block view showing the functional configurations of an operational terminal and a label printer in a modification example where a condition for emphasized indication is set for a number in a character string to be formed by printing in no relation to numbering printing.

FIG. 10 is an explanatory view showing an example of a template.

FIG. 11A is an explanatory view showing a production example of a print label.

FIG. 11B is an explanatory view showing a production example of a print label.

FIG. 11C is an explanatory view showing a production example of a print label.

FIG. 12 is a flowchart showing control steps executed by a control circuit of the label printer.

FIG. 13 is a flowchart showing detailed steps of step S200.

DETAILED DESCRIPTION OF THE PREFERRED EMBODIMENTS

An embodiment of the present disclosure will be described below with reference to the drawings.

<Outlined Configuration of System>

The overall configuration of a print label production system 1 in relation to this embodiment will be described with reference to FIG. 1.

As shown in FIG. 1, the print label production system 1 includes an operational terminal 2 and a label printer 3 (that corresponds to a printer in this embodiment). The operational terminal 2 and the label printer 3 are connected to each other to be able to communicate with each other by wired connection such as, for example, a USB cable, or wireless connection.

The operational terminal 2 is not especially limited only when the operational terminal 2 is a terminal that can be operated by an operator and, for example, a multi-purpose PC, a tablet PC, a PDA, a multifunctional mobile phone, or the like is usable as the operational terminal 2. In the example shown in FIG. 1, the case that a multi-purpose PC is used as the operational terminal 2 is shown. The operator produces print data to be printed on a print label L (that corresponds to a first printed matter in this embodiment) using the operational terminal 2, and transmits the print data to the label printer 3.

The label printer 3 transmits and receives various types of information and instruction signals to/from the operational terminal 2, and produces the print label L for which desired printing is executed on the basis of the print data that is transmitted from the operational terminal 2 and that includes desired characters and figures.

<Details of Operational Terminal and Label Printer>

The detailed functions of the operational terminal 2 and the label printer 3 will be described with reference to FIG. 2. In FIG. 2, the operational terminal 2 includes a CPU 12 (that corresponds to a computing device), a memory 13 that includes, for example, a RAM, a ROM, or the like, an operational part 14 that includes a keyboard, a mouse, and the like, and into which an instruction and information from the operator are input, a display part 17 that displays various types of information and messages thereon, a memory 16 that includes, for example, a hard disc device and that has various types of information stored therein, and a communication control part 15 that executes control of transmission and reception of information signals with the label printer 3 through interface connection according to a standard such as, for example, USB.

The CPU 12 executes the control of the overall operational terminal 2 by executing signal processing in accordance with the programs (including the print processing program of this embodiment to execute the steps of the flowchart in FIG. 6 described later) stored in advance in a ROM or the memory 16, using the temporary storage function of a RAM not shown. For example, the CPU 12 transmits and receives various types of information•instruction signals to/from the label printer 3 through the communication control part 15 by executing the signal processing.

The label printer 3 is a device to be operated by the operational terminal 2 on which the print processing program of this embodiment is executed. The label printer 3 includes a tape roll holder part 210, a feeder 209 (that corresponds to the first feeder in this embodiment), a thermal head 205 (that corresponds to the first printing head in this embodiment), a cutter 207, a control circuit 202, an operational part 206 capable of executing various types of operation, a display part 211 that executes various types of displaying, and a communication control part 208 that executes control of transmission and reception of various types of information•instruction signal to/from the operational terminal 2.

A tape holder part 210 is disposed for a tape roll 204 having a tape 203 (that corresponds to the first print-receiving medium) wound thereon (originally in a spiral but simply shown as concentric circles), to be able to be attached thereto and detached therefrom (or for a cartridge including the tape roll 204 to be able to be attached thereto or detached therefrom).

The feeder 209 feeds the tape 203 that is wound on the tape roll 204.

The thermal head 205 is disposed facing the feeder 209 and executes desired printing for the tape 203 fed out from the tape roll 204 and fed thereto by the feeder 209. In this case, the thermal head 205 is a thermal head capable of forming a print using plural colors on the tape 203. The tape 203 is configured to be able to develop the plural colors (such that the developed color is changed in accordance with the amount of received heat in this example). For example, when the tape 203 is heated up to a relatively high temperature, the tape 203 develops a red color (that corresponds to an example of a second color, and this may be a color other than the red color) and, when the tape 203 is heated up to a relatively low temperature, the tape 203 develops a black color (that corresponds to an example of a first color, and this may be a color other than the black color). Energizing for the plural heat generating elements (not shown) included in the thermal head 205 is controlled to be variable and, as a result, the thermal head 205 can selectively execute the print formation using the plural colors (print formation by developing the red color and print formation by developing the black color in this example) (the details thereof will be described later).

The cutter 207 cuts the tape 203 whose printing comes to an end, into a predetermined length to produce the print label L.

The control circuit 202 includes a CPU and this CPU executes the signal processing in accordance with the programs (including the label production processing program to execute the steps shown in the flowchart of FIG. 13 in a modification example described later) stored in advance in a ROM not shown using the temporary storage function of a RAM not shown and, as a result, executes the control of the overall label printer 3. The control circuit 202 executes transmission and reception of various types of information•instruction signals to/from the operational terminal 2 through the communication control part 208.

<Outlined Operation of System>

In the print label production system 1 having the above configuration, the operational terminal 2 generates the print data to generate the plural print labels L and outputs the print data to the label printer 3, based on operations by the operator on the operational part 14. The label printer 3 executes print formation of print objects using the thermal head 205 for the tape 203 fed by the feeder 209. As a result, plural print labels L each including the print object (such as a character string or a bar code) are consecutively produced.

<Numbering Printing>

In this embodiment, when plural print labels L are produced, the print objects each include a print number that can be incremented in accordance with the predetermined regularity. The label printer 3 sequentially produces the plural print labels L each having the print object including the incremented print number, formed thereon by printing (what-is-called numbering printing). For example, in the example shown in FIG. 3, the print labels L having the character strings "No. 1", "No. 2", "No. 3", "No. 4", "No. 5", "No. 6", "No. 7", "No. 8", "No. 9", and "No. 10" each as the print object (hereinafter, each property referred to simply as "a print label L of "No. 1" or the like) are sequentially produced along the feeding direction of the feeder 209. In this example, the character strings of "1" to "10" except "No." are the print numbers in the print labels L of "No. 1" to "No. 10", and incrementing is executed by one at one time in a range of 1 to 10 like "1" to "2" to "3" to "4" to "5" to "6" to "7" to "8" to "9" to "10" (=the increment interval is 1 and this corresponds to an example of the predetermined regularity) (the setting of this increment mode and the printing colors of the black color•the red color shown in FIG. 3 will be described later).

<Features of this Embodiment>

In the case that the print labels L are produced as above, only when the print number in each of the print objects in the print labels L to be incremented as above (in the above example, "1" to "10") presents a specific value or the value thereof is included in a specific range, a need to emphasize only this print number distinguishing this print number from the others may be present. For example, in the numbering printing of the 10 print labels L of "No. 1", "No. 2", "No. 3", "No. 4", "No. 5", "No. 6", "No. 7", "No. 8", "No. 9", and "No. 10", the case is present where it is desired to emphasize a number portion "2" of "No. 2", a number portion "3" of "No. 3", and a number portion "8" of "No. 8". This embodiment copes with the need for emphasizing some of the print numbers as above. The details thereof will sequentially be described below.

<Edit Screen>

In this embodiment, when the print labels L are produced as above, the operator designates the numerical condition for the print numbers that the operator desires to emphasize. When the operator starts up a print data edit application by a proper operation on the operational part 14 of the operational terminal 2, for example, an edit screen 110 shown in FIG. 4 is displayed on the display part 17. In the shown example, the edit screen 110 is an input operational screen of a what-is-called graphical user interface (GUI) type that has an operational bar 111 in its upper portion. The operator sets a tape length and a tape width (in this example, a tape length of "58 mm" and a tape width of "29 mm") in boxes 111a and 111b in the operational bar 111 by a proper operation on the operational part 14, and also inputs a desired print object such as a character string or the like into an input screen 112 under the operational bar 111. As a result, a print image R1 of the print object is displayed in the input screen 112.

The example shown in FIG. 4 corresponds to the example described above with reference to FIG. 3, and represents the state where a text "No." is input into a frame line FL indicating the label outer shape having the label dimensions (the tape length×the tape width) of 58 mm×29 mm. In this case, in the frame line FL, for example, a designation frame FN for a print number to be incremented is set in advance (to be moved rightward as the text is input). In this example, a number "1" is inserted as the default in the designation frame FN and, as a result, the example represents the state where the character string "No. 1" is established as a whole.

<Increment Designation Screen>

The operator subsequently executes a proper operation on the operational part 14 and, as a result, for example, an increment designation screen 120 shown in FIG. 5 is displayed on the display part 17 instead of the edit screen 110 (or being inserted in the edit screen 110). In the increment designation screen 120, a box 121 to set the increment interval (that corresponds to an example of the increment mode), boxes 122a and 122b to set the increment range (that correspond to an example of the increment mode), an emphasis count box 123 to set the print number to be emphasized (that corresponds to an example of the specific numerical condition), a print button 124 to instruct the printing, and the like are disposed.

The shown example corresponds to the example described above with reference to FIG. 3. The number "1" is input into the box 121 and, as a result, an increment interval "1" is set. A number "1" is input into the box 122a and, as a result, the value at the start of the incrementing is set to be 1 (as described above with reference to FIG. 4, this "1" may be set as the default), and a number "10" is input into the box 122b and, as a result, the value at the end of the incrementing is set to be 10. As a result, a range of 1 to 10 is set as the increment range. Numbers "2", "3", and "8" are input into the emphasis count box 123 to emphasize some print numbers, that is the most significant feather of this embodiment and, as a result, 2, 3, and 8 are designated as the emphasis counts.

For example, the operator subsequently operates the "print" button 124 (=printing instruction) through the operational part 14 and, as a result, the print data to produce the plural print labels L (in the above example, the 10 print labels L of "No. 1", "No. 2", "No. 3", "No. 4", "No. 5", "No. 6", "No. 7", "No. 8", "No. 9", and "No. 10") each having the print object including the incremented print number formed thereon is generated and is output to the label printer 3 through the communication control part 15. In this embodiment, the print data generated at this time is the print data including a heating temperature element that controls the print color to be developed by the heating of the tape 203 by the thermal head 205. For each of the numbers designated in the emphasis count box 123, the temperature is set in the print data such that the number is heated to a relatively high temperature (that is, the number is printed being emphasized in the red color) and, for the portion other than the number, the temperature therefor is set in the print data such that the portion is heated to a relatively low temperature (that is, the portion is printed in the black color without being emphasized).

<Production Example of Print Labels>

FIG. 3 shows the case that the print labels L are produced by the label printer 3 on the basis of the print data generated as above. As above, in this case, the 10 print labels L of "No. 1", "No. 2", "No. 3", "No. 4", "No. 5", "No. 6", "No. 7", "No. 8", "No. 9", and "No. 10" are generated. In this case, in accordance with the designation for the emphasis counts of 2, 3, and 8 in the emphasis count box 123, the number "2" in the print label L of "No. 2" is printed in the red color, the number "3" in the print label L of "No. 3" is printed in the red color, and the number "8" in the print label L of "No. 8" is printed in the red color. In each of these three print labels L, "No." other than the number is printed in the black color as usual.

For the print labels L of "No. 1", "No. 4", "No. 5", "No. 6", "No. 7", "No. 9", and "No. 10" other than the print labels L of "No. 2", "No. 3", and "No. 8", the overall print objects, that is, the portions of "No." and the portions of "1", "4", "5", "6", "7", "9", and "10" are both printed in the black color.

As a result, when the 10 print labels L of "No. 1" to "No. 10" are produced, the print label L "No. 2" whose only "2" is emphasized by red indication, the print label L "No. 3" whose only "3" is emphasized by red indication, and the print label L "No. 8" whose only "8" is emphasized by red indication are produced.

<Control Steps>

The control steps executed by the CPU 12 of the operational terminal 2 on the basis of the print processing program stored in the ROM (or the memory 16) as the recording medium to realize the above technique will be described with reference to FIG. 6.

In FIG. 6, the process shown in this flow is started by, for example, turning on of the electric power source of the operational terminal 2.

At step S10, the CPU 12 accepts and acquires the content of the text portion (that is the portion other than the print number to be incremented and that is the character string "No." in the above example) of the print object to be formed on the print label L input by the operator through the operational part 14.

At step S20, the CPU 12 subsequently accepts and acquires the increment mode of the print numbers included in the print objects input into the boxes 121, 122a, and 122b by the operator through the operation on the operational part 14. In the above example, the increment interval "1" and the increment range "1 to 10" are acquired. Step S20 corresponds to an increment mode acceptance step described in the appended claims. When step S20 comes to an end, the control step moves to step S30.

At step S30, the CPU 12 accepts and acquires the specific numerical condition (in the above example, 2, 3, and 8) to be emphasized in the print labels L of the print numbers designated in the emphasis count box 123 by the operator through the operation on the operational part 14. Step S30 corresponds to a condition acceptance step described in the appended claims. When step S30 comes to an end, the control step moves to step S40.

At step S40, the CPU 12 determines whether any print number satisfying the specific numerical condition acquired at step S30 is present among the print numbers each incremented in the increment mode acquired at step S20. Step S40 corresponds to a determination step described in the appended claims. For example, in the above example, the print numbers 2, 3, and 8 each satisfying the specific numerical condition at step S30 are present among the print numbers 1, 2, 3, 4, 5, 6, 7, 8, 9, and 10 each incremented in the mode acquired at step S20 and, as a result, the determination at step S40 is satisfied (S40:YES) and the control step moves to step S50.

At step S50, the CPU 12 generates print data to set only the pertinent print numbers satisfying the specific numerical condition (that is, the numbers "2", "3", and "8" in the above example) to be printed in the red color and to set the portions other than the print numbers ("No." and the numbers "1", "4", "5", "6", "7", "9", and "10" in the above example) to be printed in the black color. The control step subsequently moves to step S70 described later.

On the other hand, when it is determined at step S40 that any print number satisfying the specific numerical condition acquired at step S30 is not present among the print numbers incremented in the mode acquired at step S20, the determination at step S40 is not satisfied (S40:NO) and the control step moves to step S60. At step S60, the CPU 12 generates print data to set the overall area of all the print objects to be printed in the black color. Step S60 and step S50 correspond to a data generation step described in the appended claims. When step S60 comes to an end, the control step moves to step S70.

At step S70, the CPU 12 outputs the print data generated at step S50 or step S60 to the label printer 3 through the communication control part 15. The CPU 12 subsequently causes this flow to come to an end. Step S70 corresponds to a data output step described in the appended claims.

<Advantages of this Embodiment>

As above, in this embodiment, in the case that the label printer 3 produces the plural print labels L, when the print numbers in the print objects on the print labels L each satisfy the specific numerical condition designated by the operator, the label printer 3 prints the print numbers in the red color and prints the portion other than the print numbers in the black color.

The present disclosure is not limited to the embodiment and various modifications can be made thereto within the scope not departing from the gist and the technical idea thereof. Such modification examples will be described below.

(1) Case that Overall Print Object Designated by Emphasis Count is Printed in Red Color When "2", "3", and "8" are designated in the emphasis count box 123 as above, the overall area of each of "No. 2", "No. 3", and "No. 8" of the designated print objects (that is, both of "No.", and "2", "3", and "8") may be printed in the red color as shown in FIG. 7.

(2) Case that Emphasis Process is Executed Using Font Type, Font Style, Font Size, and Like The embodiment has been described taking the example of the case that, when any print number satisfying the designated numerical condition is present among the print numbers in the print objects on the print labels L, the print data is generated such that the color is developed into the red color different from the usual black color as the predetermined emphasis process while the emphasis is not limited to this. The print data may be generated such that a font type different from that of other numbers (such as Mincho•gothic), a font style different therefrom (such as a bold type•an oblique type), a font size different therefrom (such as 12 pt, 10 pt), and decoration different therefrom (such as an underline•a shade) are applied to the pertinent print numbers.

For example, in the example shown in FIG. 8, the number "2" on the print label L of "No. 2", the number "3" on the print label L of "No. 3", and the number "8" on the print label L of "No. 8" are exceptionally printed in an oblique type, in a bold type, and at a large font size in response to the designation for "2", "3", and "8" in the above emphasis count box 123. On the other hand, the overall print labels L of "No.", and "No. 1", "No. 4", "No. 5", "No. 6", "No. 7", "No. 9" and "No. 10" other than the numbers in the three print labels L are printed in an ordinary character style (not the oblique style), in a fine print (not the bold type), and at a small font size (not the large font size).

(3) Case that Condition for Emphasized Indication is Set for Numbers in Character String Formed by Printing in No Relation to Numbering Printing In the embodiment, in the numbering printing associated with the incrementing of the print number, the above emphasis process is executed for some of the plural print labels L produced in accordance with the incrementing (=produced by the numbering printing) by designating the emphasis count in the emphasis count box 123 for the print numbers to be incremented. In contrast, in this modification example, the emphasis process same as that of the embodiment is executed when the number in the character string formed by printing on the tape 203 (that corresponds to a second print-receiving medium in this modification example) satisfies a predetermined numerical condition (whose details will be described later) in no relation to the numbering printing (for example, even in the case that one print label L is produced alone, or the like, and not by the numbering printing). The details thereof will be described below with reference to FIG. 9 to FIG. 13. Components equivalent to those of the embodiment will be given the same reference numerals, and will not again be described or will simply be described.

<Details of Operational Terminal and Label Printer>

In this modification example, the label printer 3 includes a template storage part 2012 that has templates transmitted from the operational terminal 2 stored therein, and executes what-is-called template printing to assign a character string to a text object of a template T. FIG. 9 shows the functional configurations of the operational terminal 2 and the label printer 3 in this modification example.

In FIG. 9, the label printer 3 (that corresponds to a printed matter producing apparatus in this modification example) includes a memory 201 that includes the template storage part 2012 (that corresponds to a memory) in addition to the configuration of the label printer 3 shown in FIG. 2. The label printer 3 includes the tape holder part 210, the feeder 209 (that corresponds to a second feeder in this modification example), the thermal head 205 (that corresponds to a second printing head in this modification example), the cutter 207, the control circuit 202, the operational part 206, the display part 211, the communication control part 208, and the memory that has various types of information stored therein.

The control circuit 202 includes a CPU and, similarly to the embodiment, this CPU executes the control of the overall label printer 3 by executing signal processing in accordance with the programs (including the control program to execute the steps of the flowcharts in FIG. 12 and FIG. 13 described later) stored in advance in a ROM not shown as a recording medium or the memory 201, using the temporary storage function of a RAM not shown. A template T (see FIG. 10 described later) stored in the memory 16 of the operational terminal 2 is, for example, transmitted in advance to the label printer 3 and is stored in the template storage part 2012. The template T is used to allocate the print object such as a character string produced by the operational terminal 2.

<Template>

FIG. 10 shows an example of the template T. In FIG. 10, the template T is a template to allocate at least one print object including a character string that is produced by the operator on the operational terminal 2 (or that is externally acquired by the operational terminal 2 in accordance with a proper operation), in a predetermined mode. In the template T in this example, three print objects F1, F2, and F3 are allocated in this order. Only one print object may be disposed not limiting to the plural print objects while at least one print object is a text object that includes a character string including a number. In this example, as shown in FIGS. 11A-11C, the print object F2 is a text object that includes a character string including a number, the print object F1 is a text object that includes a character string, and the print object F3 is a bar code object.

The operator can assign any desired character string to the print objects F1, F2, and F3 allocated to the template T by an operation on the operational part 14. The operator reads the template T stored in the template memory 2012 of the label printer 3 by a proper operation on the operational part 14 to cause the template T to be displayed on a proper screen on the display part 17. The operator inputs the character string into the print objects F1, F2, and F3 by a proper operation on the operational part 14 and, as a result, executes character string assignment to the print objects. The operator subsequently issues a printing instruction by an operation on the operational part 14 (a printing instruction by the operational part 206 of the label printer 3 may also be used) and, as a result, the label printer 3 generates print data that including the assigned character string. The feeder 209, the thermal head 205, and the like are controlled to be in cooperation with each other to produce (print) the pertinent one print label L having the character string and the like formed thereon by printing.

<Production Example of Print Label>

FIG. 11A shows an example of the print label L produced as above, and shows an example that is used as, for example, a price tag for indicating discount. In the shown example, a character string f1 that is "PRICE DOWN" that represents the discount is assigned to the print object F1 of the template T, a character string f2 that is "10% OFF" that represents the discount rate is assigned to the print object F2 thereof, and a bar code image f3 generated in accordance with the character strings "PRICE DOWN" and "10% OFF" is assigned to the print object F3. As a result, a pertinent one print label L1 (that corresponds to the second printed matter in this modification example) is generated (the print color thereof will be described later).

FIG. 11B shows another example of the produced print label L. In the shown example, the character string f2 that is "20% OFF" representing the discount rate is assigned to the print objet F2 to generate one print label L2 (that corresponds to the second printed matter in this modification example) (the print color thereof will be described later).

FIG. 11C shows yet another example of the produced print label L. In the shown example, the character string f2 that is "70% OFF" representing the discount rate is assigned to the print objet F2 to generate a print label L3 (that corresponds to the second printed matter in this modification example) (the print color thereof will be described later).

<Features of this Modification Example>

In the case that the numbers are included in the character strings on the print labels L as above, similarly to the embodiment, only when each of the numbers presents a specific value or the value thereof is included in a specific range, a need to emphasize only the number distinguishing the number from the others may be present. As an example, a need to emphasize the number of OO is present when the number of OO is equal to or greater than a threshold value (for example, 50) in the discount indication of "OO % OFF" of the character string f2 in FIGS. 11A-11C, or the like.

In this modification example, when the operator inputs the character string using the operational part 14 (or a timing before or after this inputting may be employed), the operator instructs by inputting the specific numerical condition (to be equal to or greater than 50 in the above example) for the character strings to be emphasized on the print label L to be produced, using the operational part 14 (or the operational part 206). The control circuit 202 of the label printer 3 determines whether any number satisfying the specific numerical condition (a number equal to or greater than 50 in the above example) is included in the character string formed by the assignment as above (the character string assigned to the print object F2 in the above example). When the control circuit 202 determines that a number satisfying the specific numerical condition is included therein, the predetermined emphasis process is applied to the number to be formed by printing.

As to each of the print labels L1, L2, and L3 respectively shown in FIG. 11A, FIG. 11B, and FIG. 11C, presence or absence of the emphasis process is determined in accordance with the result of the determination. In this example, similarly to the embodiment, the emphasis process is the execution of the printing in the red color (an example of a second color) and the printing is executed in the black color (an example of a first color) for a portion other than the portion having the emphasis process applied thereto.

In the print label L1 in FIG. 11A, the character string f2 is "10% OFF" and the number "10" in the character string is lower than the threshold value (=50) for the emphasis indication. As a result, in the print label L1, the character string f2 of "10% OFF" is printed in the black color together with the character string f1 of "PRICE DOWN" and the bar code image f3.

As to the print label L2 of FIG. 11B, the character string f2 is "20% OFF" and, similarly to the above, the number "20" in the character string is lower than the threshold value (=50) for the emphasis indication. As a result, as to the print label L2, the character string f2 of "20% OFF" is printed in the black color together with the character string f1 of "PRICE DOWN" and the bar code image f3.

As to the print label f3 in FIG. 11C, the character string f2 is "70% OFF" and the number "70" in the character string is equal to or greater than the threshold value (=50) for the emphasis indication. As a result, as to the print label L3, only the number 70 in the character string f2 of "70% OFF" is exceptionally printed in the red color (as the emphasis process). "% OFF" of the character string f2 of "70% OFF", the character string f1 of "PRICE DOWN", and the bar code image f3 other than the number are printed in the black color as usual.

<Control Steps>

Control steps executed by the control circuit 202 of the label printer 3 to realize the above technique will be described with reference to FIG. 12.

In FIG. 12, the process shown in this flow is started by, for example, turning on of the electric power source of the label printer 3.

At step S110, the control circuit 202 determines whether the operator executes the operation to receive the template T from the operational terminal 2 through the operational part 206. This operation may be executed on the operational part 14 on the side of the operational terminal 2. For example, when the above operation is not executed because of the reason that the desired template T is already stored in the template storage part 201, or the like, the determination at step S110 is not satisfied (S110:NO) and the control step moves to step S125 described later. When the above operation is executed, the determination at step S110 is satisfied (S110:YES) and the control step moves to step S120.

At step S120, the control circuit 202 receives the template T that is transmitted from the operational terminal 2 through the communication control part 15, through the communication control part 208, and causes the template storage part 2012 of the memory 201 to store therein the template T. The control step subsequently moves to step S125.

At step S125, as above, the control circuit 202 reads the template T from the template storage part 2012 on the basis of the operation on the operational terminal 2, causes the template T to be displayed in a proper screen on the display part 17 of the operational terminal 2, accepts inputting of character strings (that is, assignment of the character strings) into the print objects F1 and F2 in the template T by an operation on the operational part 14 in accordance with the display, and stores the result of the acceptance (=the content of the assignment, that is, the content of the template T after the assignment comes to an end) in a proper place (for example, a memory disposed inside thereof). The control step subsequently moves to step S127.

At step S127, as above, the control circuit 202 sets the specific numerical condition (that is to be equal to or greater than 50 in the above example) for the character string to be emphasized in the print label L to be produced in accordance with the inputting of the instruction by an operation on the operational part 14 of the operational terminal 2 (or an operation on the operational part 206) and stores the specific numerical condition in a proper place (for example, a memory disposed inside). The control step subsequently moves to step S130. The control circuit 202 executing step S127 corresponds to a condition setting process described in the appended claims.

At step S130, the control circuit 202 determines whether the printing instruction signal in accordance with the printing instruction transmitted from the operational terminal 2 through the communication control part 15 is received through the communication control part 208. The printing instruction may be issued using the operational part 206 of the label printer 3. When the printing instruction signal is not received, the determination at step S130 is not satisfied (S130:NO), the control step returns to step S110 and the same steps are repeated. On the other hand, when the printing instruction signal is received, the determination at step S130 is satisfied (S130:YES) and the control step moves to step S140.

At step S140, the control circuit 202 determines whether any number satisfying the specific numerical condition (that is to be equal to or greater than 50 to be the threshold value for the emphasis indication in the above example) set at step S127 is included in the character strings in the print objects (the print objects F1, F2, and F3 in this example) formed on the print label L, on the basis of the assignment result stored at step S125. When the control circuit 202 determines that the number satisfying the specific numerical condition is included in the character strings (the case that the print label L3 shown in FIG. 11C is produced in the above example), the determination at step S140 is satisfied (S140:YES) and the control step moves to step S150. The control circuit 202 executing step S140 corresponds to a determination process described in the appended claims.

At step S150, the control circuit 202 sets the print formation color for the number satisfying the specific numerical condition ("70" of the character string f2 of "70% OFF" on the print label L3) to be the red color and sets the print formation color for the character strings other than this, that is, "% OFF" in the character string f2 of "70% OFF", the character string f1 of "PRICE DOWN", and the bar code image f3" to be the black color. The control step subsequently moves to step S160.

At step S160, the control circuit 202 generates print data including the result of the assignment at step S125 with the color setting at step S150 added thereto (=including the heating temperature element). The control step subsequently moves to step S200 described later.

On the other hand, when the control circuit 202 determines at step S140 that no number satisfying the specific numerical condition is included in the character strings (the case that the print label L1 shown in FIG. 11A and the print label L2 shown in FIG. 11B are produced, in the above example), the determination at step S140 is not satisfied (S140:NO) and the control step moves to step S170. At step S170, the control circuit 202 sets the print formation color for the overall areas of all the print objects to be the black color. The control step subsequently moves to step S180.

At step S180, the control circuit 202 generates print data including the result of the assignment at step S125 with the color setting at step S170 added thereto (=including the heating temperature element). The control step subsequently moves to step S200 described later.

At step S200, the control circuit 202 executes a label production process (whose details will be described later) to control the feeder 209, the thermal head 205, and the like in cooperation with each other to produce the pertinent one print label L using the print data generated at step S160 or step S180. As a result, the process shown in this flow comes to an end. The control circuit 202 executing step S150, step S160, step S170, step S180, and step S200 corresponds to a coordination control process described in the appended claims.

FIG. 13 shows the detailed steps of the label production process at step S200. In FIG. 13, at step S210, the control circuit 202 first outputs a control signal to the feeder 209 to start feeding of the tape 203.

At step S220, the control circuit 202 subsequently determines whether the position of the tape 203 in the feeding direction reaches a desired printing starting position, using a known technique. Until the time when the position of the tape 203 reaches the printing starting position, the determination at step S220 is not satisfied (S220:NO) and the process step returns to step S210 and the same steps are repeated. When the position of the tape 203 reaches the printing starting position, the determination at step S220 is satisfied (S220:YES) and the process step moves to step S230.

At step S230, the control circuit 202 outputs a control signal to the thermal head 205 to start the printing using the print data generated at step S160 or step S180 onto the tape 203. The process step subsequently moves to step S240.

At step S240, the control circuit 202 determines whether the position of the tape 203 in the feeding direction reaches a desired printing ending position, using a known technique. Until the time when the position of the tape 203 reaches the printing ending position, the determination at step S240 is not satisfied (S240:NO) and the process step loop-stands by. When the position of the tape 203 reaches the printing ending position, the determination at step S240 is satisfied (S240:YES) and the process step moves to step S250.

At step S250, the control circuit 202 outputs a control signal to the thermal head 205 to cause the printing onto the tape 203 to come to an end. When step S250 comes to an end, the process step moves to step S260.

At step S260, the control circuit 202 determines whether the position of the tape 203 in the feeding direction reaches a tape cutting position, using a known technique. Until the time when the position of the tape 203 reaches the tape cutting position, the determination at step S260 is not satisfied (S260:NO) and the process step loop-stands by. When the position of the tape 203 reaches the tape cutting position, the determination at step S260 is satisfied (S260:YES) and the process step moves to step S270.

At step S270, the control circuit 202 outputs a control signal to the feeder 209 to cause the feeding of the tape 203 to be discontinued. When step S270 comes to an end, the process step moves to step S280.

At step S280, the control circuit 202 outputs a control signal to the cutter 207 to cause the cutter 207 to cut the tape 203 whose printing comes to an end. As a result, the print label L having the print in accordance with the print data generated at step S160 or step S180 formed thereon is generated. As a result, the process shown in this routine comes to an end and the process step returns to the flow in FIG. 12. As a result, the flow in FIG. 12 comes to an end.

<Advantages of this Modification Example>

As above, the label printer 3 of this modification example executes what-is-called template printing to assign the character strings and the like to the print objects F1, F2, and F3 in the template T, and the pertinent print label L is produced. In this case, when a number satisfying the specific numerical condition (to be equal to or greater than 50 in the above example) designated by the operator is included in the character string assigned to the template T, the number is printed in the red color for the emphasis indication and those other than the number are printed in the black color (see step S150, step S160, step S170, and step S180).

This modification example, has been described taking the example where the print data is generated to develop the color to be the red color that is different from the black color to be usually used as the predetermined emphasis process when a number satisfying the specific numerical condition is present among the numbers in the text object of each of the print labels L while the emphasis is not limited to this. Similarly to the modification example (2), the print data may be generated such that a font type different from that of the others (such as Mincho•gothic), a font style different therefrom (such as a bold type•an oblique type), a font size different therefrom, and decoration different therefrom (such as an underline•a shade) are applied to the pertinent number.

(4) Others

In the above, arrows shown in FIG. 2 and FIG. 9 indicate an example of the flows of the signals and do not limit the flow directions of the signals.

The flowcharts shown in FIG. 6, FIG. 12, and FIG. 13 each do not limit the present disclosure to the shown steps, and any addition·deletion to/from, any change of order, and the like of the steps may be made within the scope not departing from the gist and the technical idea of the present disclosure.

In addition to the above, the techniques in accordance with the embodiment and the modification examples may be used properly in combination.

In addition, though not individually exemplified, the present disclosure is implemented with various changes made thereto within the scope not departing from the gist thereof.

What is claimed is:

1. A non-transitory computer-readable recording medium, storing a print processing program for executing steps on a computing device, said computing device provided to an operational terminal connected to a printer that comprises a feeder configured to feed a print-receiving medium and a printing head configured to execute printing of a print object on said print-receiving medium fed by said feeder and is configured to consecutively produce plural printed matter each having said print object on said print-receiving medium, in a predetermined order along a feeding direction of said feeder, said steps comprising:
   an increment mode acceptance step for accepting a setting operation of an increment mode of at least one print number that is included in said print object and is capable of being incremented in accordance with predetermined regularity;
   a condition acceptance step for accepting a setting of a numerical condition of said print number to be emphasized in printed matter of said printed matter;
   a determination step for determining whether or not said print number included in a corresponding said print object satisfies said numerical condition accepted in said condition acceptance step when each of said plural printed matter is produced;
   a data generation step for generating print data to generate said plural printed matter each having said print object formed that comprises said print number incremented in accordance with an acceptance result in said increment mode acceptance step; and
   a data output step for outputting said print data generated in said data generation step to said printer, and
   in said data output step, in a case that it is determined in said determination step that said print number included in said print object satisfies said numerical condition, said print data being generated to apply a predetermined emphasis process to the print number in said printed matter to be produced, the print number satisfying said numerical condition.

2. The recording medium according to claim 1, wherein said printing head of said printer is configured to form a print by using development of plural colors that comprise a first color and a second color different from said first color, and wherein
   in said data output step, in the case that it is determined in said determination step that said print number included in said print object satisfies said numerical condition, said print data is generated to form at least a number that is included in said printed matter to be produced and satisfies said numerical condition by using development of said second color as said predetermined emphasis process and to form a portion other than a portion in said second color by using development of said first color.

3. The recording medium according to claim 2, wherein said print-receiving medium is configured to show a developed color of the print-receiving medium, the developed color being changed in accordance with an amount of received heat, wherein
   said printing head is a thermal head that comprises plural heat generating elements and that is configured to selectively execute print formation onto said print-receiving medium by using plural colors by variably controlling energization to said plural heat generating elements, and wherein
   in said data generation step, said print data comprising a heating temperature element is generated, the heating temperature element controlling a print color developed by heating said print-receiving medium by said thermal head.

4. The recording medium according to claim 1, wherein
   in said data output step, in the case that it is determined at said determination step that said print number included in said print object satisfies said numerical condition, said print data is generated to form at least a number in said printed matter to be produced by applying a font type, a font style, a font size, or decoration different from those of another portion to at least said number as said predetermined emphasis process, wherein the number satisfies said numerical condition.

5. A printed matter producing apparatus comprising:
   a feeder configured to feed a print-receiving medium;
   a printing head configured to form a print comprising a character string on said print-receiving medium fed by said feeder; and
   a CPU configured to form printed matter having said character string formed thereon by controlling said feeder and said printing head in cooperation with each other, that is triggered by a printing instruction,
   the CPU being configured to execute:
   a condition setting process for setting a numerical condition for said character string to be emphasized in said printed matter;
   a determination process for determining whether or not a number satisfying said numerical condition set in said condition setting process is included in said character string formed by said printing head when said printed matter is formed in accordance with said printing instruction; and
   a coordination control process for applying a predetermined emphasis process to said number satisfying said numerical condition in said printed matter to be formed, by controlling said feeder and said printing head in cooperation with each other in a case that it is determined in said determination process that said number satisfying said numerical condition is included in said character string formed by said printing head.

6. The printed matter producing apparatus according to claim 5, wherein
   said printing head is configured to form a print by using development of plural colors that comprise a first color and a second color different from said first color, and wherein
   in said coordination control process, in the case that it is determined in said determination process that said number satisfying said numerical condition is included in said character string formed by said printing head, said feeder and said printing head are controlled in cooperation with each other to form said number satisfying said numerical condition by using development of said second color as said predetermined emphasis process and to form a portion other than said number in said second color by using development of said first color in said printed matter to be produced.

7. The printed matter producing apparatus according to claim 6, wherein
said print-receiving medium is configured to show a developed color of the print-receiving medium, the developed color being changed in accordance with an amount of received heat, wherein
said printing head is a thermal head that comprises plural heat generating elements and that is configured to selectively execute print formation onto said print-receiving medium by using plural colors by variably controlling energization to said plural heat generating elements, and wherein
in said coordination control process, said predetermined emphasis process is applied on the basis of print data comprising a heating temperature element for controlling a print color that is configured to develop by heating said print-receiving medium by said thermal head.

8. The printed matter producing apparatus according to claim 5, wherein
in said coordination control process, said feeder and said printing head are controlled in cooperation with each other to form said number satisfying said numerical condition in said printed matter to be produced, by applying a font type, a font style, a font size, or decoration different from those of another portion to said number as said predetermined emphasis process in the case that it is determined in said determination process that said number satisfying said numerical condition is included in said character string formed by said printing head.

9. The printed matter producing apparatus according to claim 5, further comprising
a memory configured to store a template that plural print objects comprising at least one text object are assigned in a predetermined mode and at least one character string is assigned to said at least one text object, wherein
in said coordination control process, by controlling said feeder and said printing head, that is triggered by said printing instruction, said at least one character string is assigned to said at least one text object of said template stored in said memory and thereby said printed matter corresponding thereto is formed, and wherein
in a case that it is determined in said determination process that a number satisfying said numerical condition is included in said character string assigned to said template, said feeder and said printing head are controlled in cooperation with each other to apply the predetermined emphasis process to said number satisfying said numerical condition in said printed matter.

* * * * *